(12) United States Patent
Tschida et al.

(10) Patent No.: US 10,790,721 B2
(45) Date of Patent: Sep. 29, 2020

(54) BONDED ROTOR SHAFT

(71) Applicant: ABB Schweiz AG, Baden (CH)

(72) Inventors: Colin E. Tschida, Durham, NC (US); Darren Tremelling, Apex, NC (US)

(73) Assignee: ABB Schweiz AG, Baden (CH)

( * ) Notice: Subject to any disclaimer, the term of this patent is extended or adjusted under 35 U.S.C. 154(b) by 155 days.

(21) Appl. No.: 15/997,161

(22) Filed: Jun. 4, 2018

(65) Prior Publication Data

US 2019/0372425 A1 Dec. 5, 2019

(51) Int. Cl.
| | |
|---|---|
| *H02K 1/28* | (2006.01) |
| *H02K 1/27* | (2006.01) |
| *H02K 7/00* | (2006.01) |
| *H02K 5/00* | (2006.01) |
| *H02K 15/03* | (2006.01) |
| *H02K 15/14* | (2006.01) |

(52) U.S. Cl.
CPC ............. *H02K 7/003* (2013.01); *H02K 1/27* (2013.01); *H02K 5/00* (2013.01); *H02K 15/03* (2013.01); *H02K 15/14* (2013.01)

(58) Field of Classification Search
CPC .. H02K 1/22; H02K 1/28; H02K 1/30; H02K 5/00; H02K 5/24; H02K 7/00; H02K 7/003; H02K 15/00; H02K 15/03; H02K 15/14
See application file for complete search history.

(56) References Cited

U.S. PATENT DOCUMENTS

| | | | |
|---|---|---|---|
| 3,349,478 A | 10/1967 | Milton | |
| 5,200,662 A * | 4/1993 | Tagami | H02K 1/2773 310/156.61 |
| 6,353,275 B1 | 3/2002 | Nishiyama et al. | |
| 6,933,653 B2 * | 8/2005 | Fauth | H02K 1/28 310/261.1 |
| 2005/0140238 A1* | 6/2005 | Yokochi | H02K 1/246 310/168 |
| 2006/0170301 A1 | 8/2006 | Masuzawa et al. | |
| 2007/0210663 A1 | 9/2007 | Kalavsky et al. | |
| 2007/0222326 A1* | 9/2007 | Ionel | H02K 1/22 310/216.067 |
| 2008/0218007 A1 | 9/2008 | Masuzawa et al. | |
| 2008/0231138 A1 | 9/2008 | Onimaru et al. | |

(Continued)

FOREIGN PATENT DOCUMENTS

| | | |
|---|---|---|
| JP | S55-166304 | 6/1982 |
| JP | 2005-192288 A | 7/2005 |

(Continued)

OTHER PUBLICATIONS

Extended European Search Report dated Oct. 9, 2019 issued in EP Application No. 19178176.4 (9 pages).

(Continued)

*Primary Examiner* — Tran N Nguyen
(74) *Attorney, Agent, or Firm* — Taft Stettinius & Hollister LLP; J. Bruce Schelkopf

(57) ABSTRACT

A rotor is provided for an electric motor. The rotor shaft is located within a central opening of the rotor core. The central opening is sized larger than the rotor shaft such that a circumferential gap exists between the rotor core and the rotor shaft while the shaft is located by protrusions in the central opening of the rotor core. The circumferential gap is filled with a resin.

20 Claims, 4 Drawing Sheets

(56) References Cited

U.S. PATENT DOCUMENTS

| | | |
|---|---|---|
| 2009/0140598 A1 | 6/2009 | Schieweck et al. |
| 2010/0019603 A1 | 1/2010 | Saban |
| 2010/0231066 A1 | 9/2010 | Korner |
| 2010/0243197 A1 | 9/2010 | Osborne et al. |
| 2011/0012465 A1 | 1/2011 | Kawamura et al. |
| 2012/0112591 A1* | 5/2012 | Feuerrohr ............ H02K 1/2773 310/156.15 |
| 2012/0133229 A1 | 5/2012 | Jayasoma et al. |
| 2012/0146448 A1 | 6/2012 | Moghaddam et al. |
| 2013/0076193 A1 | 3/2013 | Kim et al. |
| 2013/0154430 A1 | 6/2013 | Dragon et al. |
| 2013/0162064 A1 | 6/2013 | Kim et al. |
| 2013/0285500 A1 | 10/2013 | Kinashi |
| 2014/0028119 A1 | 1/2014 | Sagalovskiiy et al. |
| 2014/0062253 A1 | 3/2014 | Andonian |
| 2015/0303756 A1 | 10/2015 | Naruse et al. |
| 2016/0141931 A1 | 5/2016 | Kawai et al. |
| 2016/0164350 A1 | 6/2016 | Matsunaga et al. |
| 2017/0317543 A1 | 11/2017 | Fujii et al. |

FOREIGN PATENT DOCUMENTS

| | | | |
|---|---|---|---|
| JP | 2009201258 | * | 9/2009 |
| JP | 2013-099222 A | | 5/2013 |
| JP | 2017-201851 A | | 11/2017 |
| WO | 2018051631 A1 | | 3/2018 |

OTHER PUBLICATIONS

Japanese Patent Office, Notification of Reasons for Refusal issued in corresponding Japanese application No. 2019-104366, dated Jun. 30, 2020, 19 pp.

Intellectual Property India, First Examination Report issued in corresponding Indian application No. 201914022043, dated May 27, 2020, 6 pp.

\* cited by examiner

BONDED ROTOR SHAFT

BACKGROUND

The present inventions relate generally to electric motors, and more particularly, to the assembly of a rotor shaft therein.

As is understood in the art, the magnetic flux in an electric motor between the stator and the rotor generates torque that is transferred to the rotor shaft. The torque that is generated thereby is used as output torque to rotate various types of equipment that may be connected to the electric motor. A rotor is typically manufactured with a rotor core having a central opening extending therethrough. The rotor shaft extends through the central opening and is rotationally fixed to the rotor core. Because the torque generated by the electric motor is transferred from the rotor core to the rotor shaft, the rotational fixation between the rotor core and the rotor shaft is critical to the integrity of the electric motor.

One conventional method for connecting the rotor shaft to the rotor core involves heating the rotor core to cause thermal expansion of the central opening extending through the rotor core. The rotor shaft may then be pressed through the central opening in the rotor core. Upon thermal cooling of the rotor core and resulting contraction of the central opening, a secure connection is formed between the rotor core and the rotor shaft. It is also possible to press the shaft through the central opening without heating, but one concern with this method is that the shaft can be bent due to the pressure needed to press the shaft into the rotor core. Shaft deformation can be a particular problem for less expensive motors where the shaft may have a relatively small diameter compared to the length of the shaft. Additionally, while a heating step may serve multiple purposes in some motors (e.g., inductance motors where the heating step also includes melting inductance bars into the rotor core), in other motors like reluctance motors the heating step serves no other purpose and is an additional manufacturing step. Also, these methods result in stress being induced on the inner diameter of the rotor, which is not ideal for electromagnetic performance of a rotor.

Accordingly, an improved method of connecting a rotor shaft to a rotor core is desirable.

SUMMARY

A rotor is described for an electric motor. The rotor includes a rotor core and a separate rotor shaft. The rotor core is provided with a central opening. The size of the central opening is larger than the rotor shaft so that a circumferential gap is located between the rotor core and the rotor shaft. The rotor shaft is located within the central opening by features that may be integral to the rotor core. A resin fills the circumferential gap to secure the rotor core and the rotor shaft together. The invention may also include any other aspect described below in the written description or in the attached drawings and any combinations thereof.

BRIEF DESCRIPTION OF SEVERAL VIEWS OF THE DRAWINGS

The invention may be more fully understood by reading the following description in conjunction with the drawings, in which.

DETAILED DESCRIPTION

Figure 1:
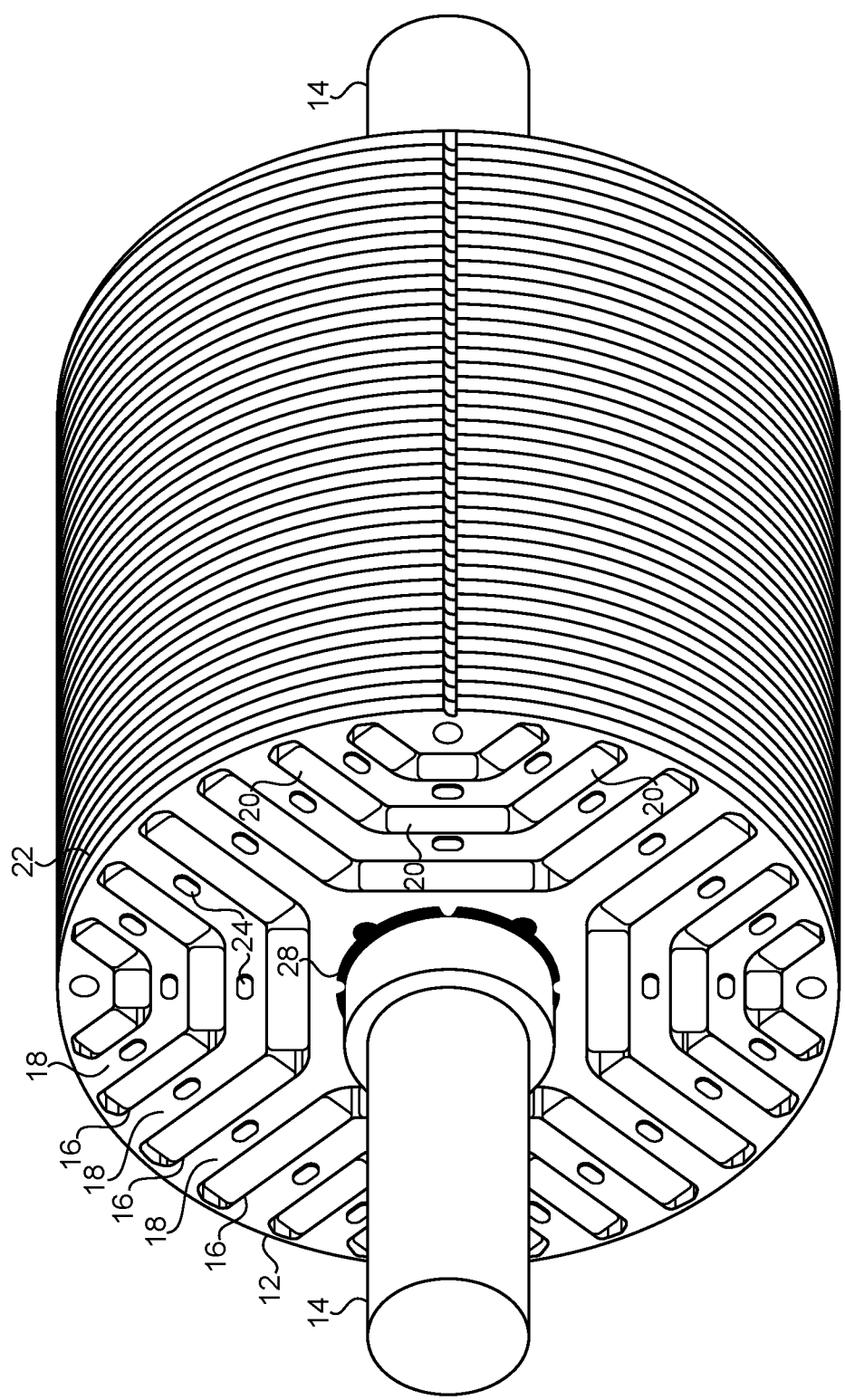
FIG. 1 is a perspective view of a rotor for an electric motor.

Referring now to the figures, and particularly FIG. 1, an electric motor rotor 10 is shown with a rotor core 12 and a rotor shaft 14. Although the rotor 10 may be used in various types of known motors, one preferred type of electric motor that the rotor 10 may be used in is a permanent magnet reluctance motor. Thus, in the described rotor 10, the rotor core 12 has longitudinal openings 16 extending therethrough which form flux guides 18, or ribs, of low magnetic reluctance. Permanent magnets 20 may also be secured within the longitudinal openings 16. Preferably, the rotor core 12 is made of a plurality of thin laminations 22 that are stacked on top of each other to form the rotor core 12. The laminations 22 are preferably punched to form the desired shape. The material of the laminations 22 is preferably steel, such as silicon steel. Although all of the laminations 22 may have the same shape as each other, it is possible that some of the laminations 22 may have non-matching shapes so that the cross-section of the rotor core 12 varies throughout. It is also preferable for each lamination 22 to be secured to the adjacent lamination 22 during stacking, for example by mechanically interlocking or bonding 24 the laminations 22 together along the flux guides 18.

Figure 2:
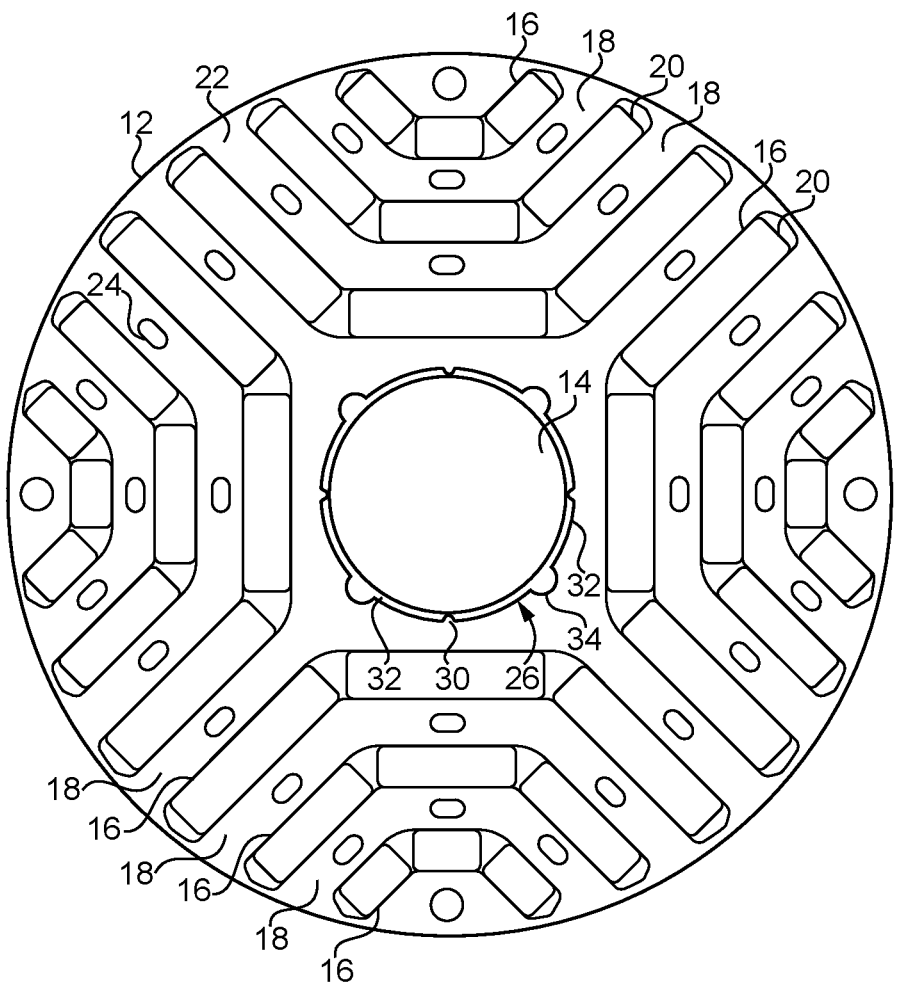
FIG. 2 is a top view of an embodiment of the rotor.

Turning to FIG. 2, the rotor shaft 14 is shown positioned in a central opening 26 of the rotor core 12. Preferably, the shaft 14 extends entirely through the rotor core 12 with a length of the shaft 14 extending past each end of the core 12. As described further below, the shaft 14 is secured to the core 12 with a resin 28. Thus, unlike conventional methods, the motor does not rely upon a press fit between the rotor core 12 and the shaft 14 to transfer torque therebetween. Therefore, the shaft 14 may be slid into the central opening 26 of the core 12 with minimal force and without heating the core 12 to thermally expand the central opening 26. It is understood, however, that in some embodiments a certain amount of force may still be needed to press the shaft 14 into the central opening 26, but any such force would be insufficient to rotationally fix the core 12 and shaft 14 together. Also, it is understood that other embodiments may include additional interlocking features (e.g., FIG. 4) to rotationally fix the core 12 and shaft 14 together. Further, the term "resin" is understood to mean an initially soft material separate from the rotor core 12 and rotor shaft 14 that hardens and fills space between the core 12 and shaft 14. Examples of resins 28 include epoxies and thermoplastics. Preferably, the resin 28 is non-metallic and is magnetically impermeable. As used herein, welding is not considered to be a type of resin.

As shown in FIG. 2, the rotor 10 is provided with at least three protrusions 30 that extend into the central opening 26. The protrusions 30 contact the shaft 14, or are within 0.001" of the shaft 14, to center the shaft 14 within the central opening 26. Preferably, the protrusions 30 contact less than 20% of the circumference of the shaft 14. Since the protrusions 30 are principally intended to locate the shaft 14 within the central opening 26, there is insufficient interference between the protrusions 30 and the shaft 14 to resist the torque produced by the motor. Thus, the protrusions 30 and the shaft 14 are not rotationally fixed together by the interface therebetween. Preferably, the protrusions 30 are fixed to the rotor core 12 by making the protrusions 30 integral therewith. Thus, where the core 12 is made of a plurality of laminations 22, the protrusions 30 may be a punched feature that is formed when the laminations 22 are punched. Thus, an additional manufacturing step is not needed to provide the protrusions 30.

Between the protrusions 30 is a circumferential gap 32 between the shaft 14 and the core 12. Thus, apart from the protrusions 30, the central opening 26 is larger than the shaft 14 so that there is no contact between the rotor core 12 and the rotor shaft 14 around the majority of the circumference of the shaft 14. Preferably, the circumferential gap 32 provides at least 0.004" clearance on each side of the shaft 14. As further described below, the circumferential gap 32 is filled with resin 28. Thus, in this embodiment, the resin 28 is the primary securement between the core 12 and the shaft 14 to withstand the torque transferred between the rotor core 12 and the rotor shaft 14.

Figure 3:
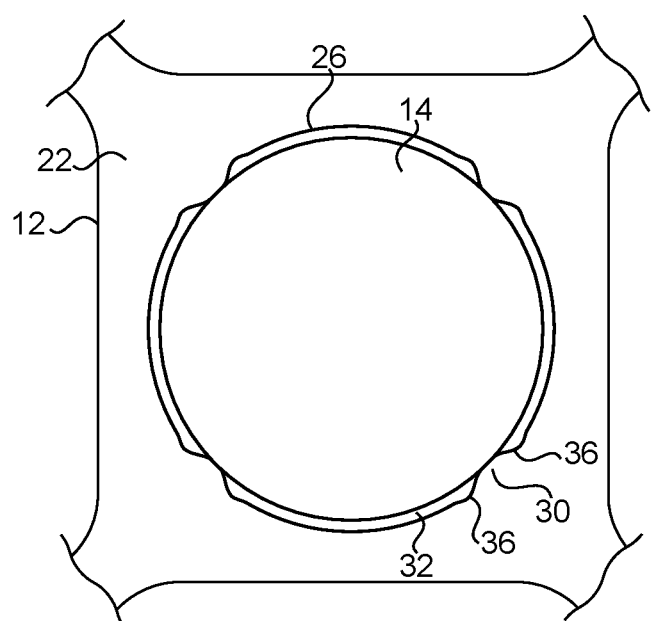
FIG. 3 is a top view of an embodiment of the rotor.

As shown in FIG. 2, the central opening 26 may also include a recess 34 that creates a larger gap between the shaft 14 and the core 12. Like the protrusions 30, it is preferable for the recesses 34, 36 in the central opening 26 to be punched into the laminations 22 at the time that the laminations 22 are formed. The recesses 34, 36 may be useful to provide a pathway for the resin 28 to flow along the length of the shaft 14. The resin 28 may then penetrate the smaller width circumferential gap 32 at least partially from the larger width recesses 34, 36. Preferably, the width of the recesses 34, 36 is at least twice the width of the circumferential gap 32. It is also preferable for the circumferential gap 32 to extend at least three times farther around the shaft 14 than the recesses 34, 36. As shown in FIG. 2, each of the recesses 34 may be centrally located between two protrusions 30, with the circumferential gaps 32 extending between the recesses 34 and the protrusions 30. Thus, in this embodiment the smaller width circumferential gap 32 is adjacent each protrusion 30 on each side thereof, and the recess 34 is located away from the protrusions 30. Alternatively, as shown in FIG. 3, the recesses 36 may be adjacent the protrusions 30 on each side thereof. Thus, in this embodiment the smaller width circumferential gap 32 may extend between the recesses 36. The recesses 36 in FIG. 3 may act as passages for the flow of resin 28 like in FIG. 2. Additionally, the recesses 36 of FIG. 3 may provide a stress relief for the protrusions 30. Because stress can reduce magnetic permeability, FIG. 3 may result in improved magnetic permeability.

Figure 4:
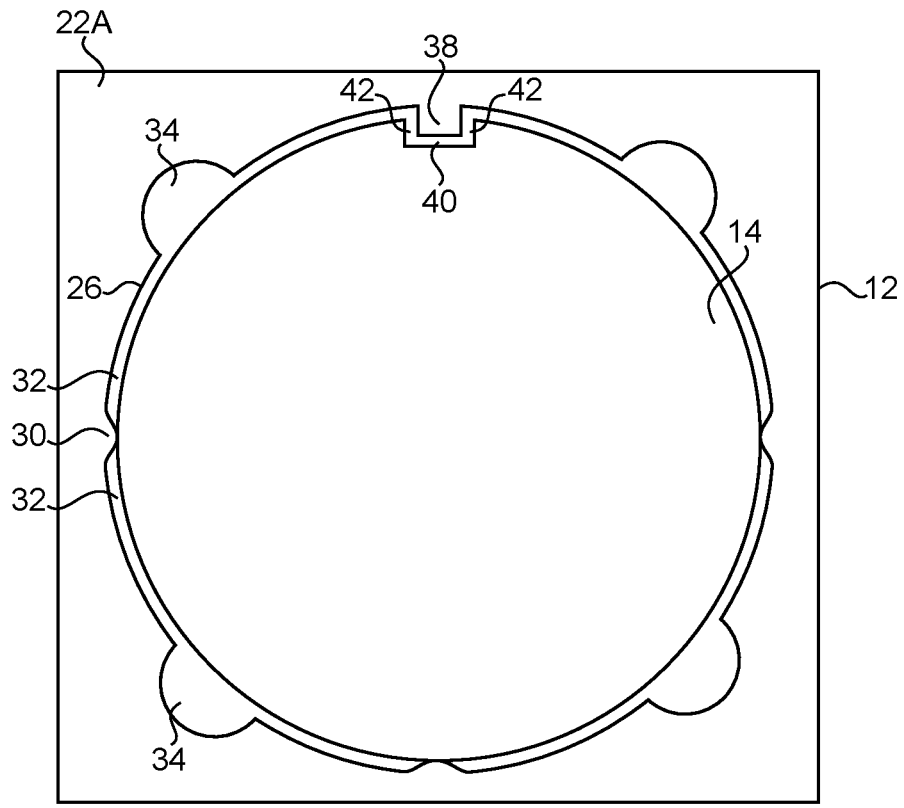
FIG. 4 is a top view of an embodiment of the rotor.

As shown in FIG. 4, it may also be desirable to provide a mechanical interlock between the rotor core 12 and the rotor shaft 14 to ensure the integrity of the connection between the shaft 14 and the core 12. As shown, the rotor core 12 may be provided with a key 38 that extends into the central opening 26. The shaft 14 may also be provided with a corresponding recess 40, such that the key 38 of the core 12 fits within the groove 40 of the shaft 14. Like the protrusions 30, recesses 34, 36, central opening 26 and longitudinal openings 16, it is preferable for the key 38 to be an integral feature that is punched into the core laminations 22 when they are formed. However, it is also possible for other non-round features to be used like corresponding flats on the shaft 14 and in the central opening 26 or grooves in both the shaft 14 and the central opening 26 with a separate key therein. An advantage of this arrangement is that the shaft 14 and the core 12 may be rotationally fixed together with the key 38 and groove 40 to ensure that the resin 28 does not fail due to shear loads. Further, in this arrangement a lateral gap 42 is preferably located on each side of the key 38 and the sides of the groove 40. Thus, the lateral gap 42 may be filled with resin 28 in addition to the circumferential gap 32. Although the resin 28 in the lateral gap 42 will experience high loads during use of the motor due to the torque transfer through the key 38 and groove 40, the load on the resin 28 in the lateral gap 42 will be a compressive load instead of a shear load. Thus, the resin 28 will be less susceptible of failure due to the higher compressive limit of the resin 28.

Figure 5:
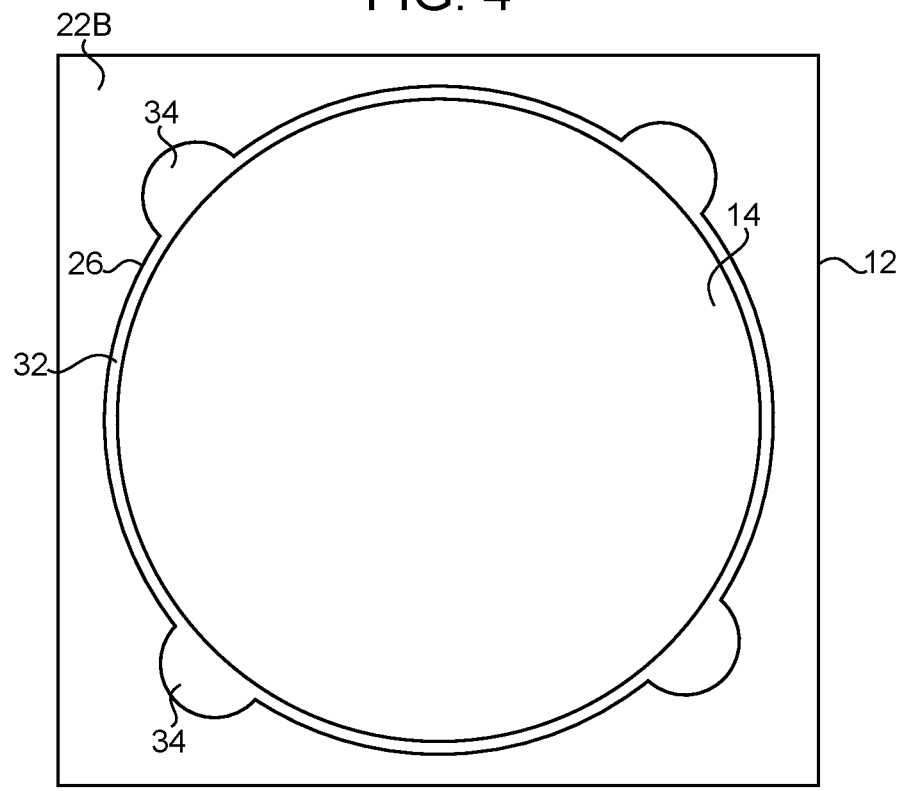
FIG. 5 is a top view of an embodiment of the rotor.
Figure 6:
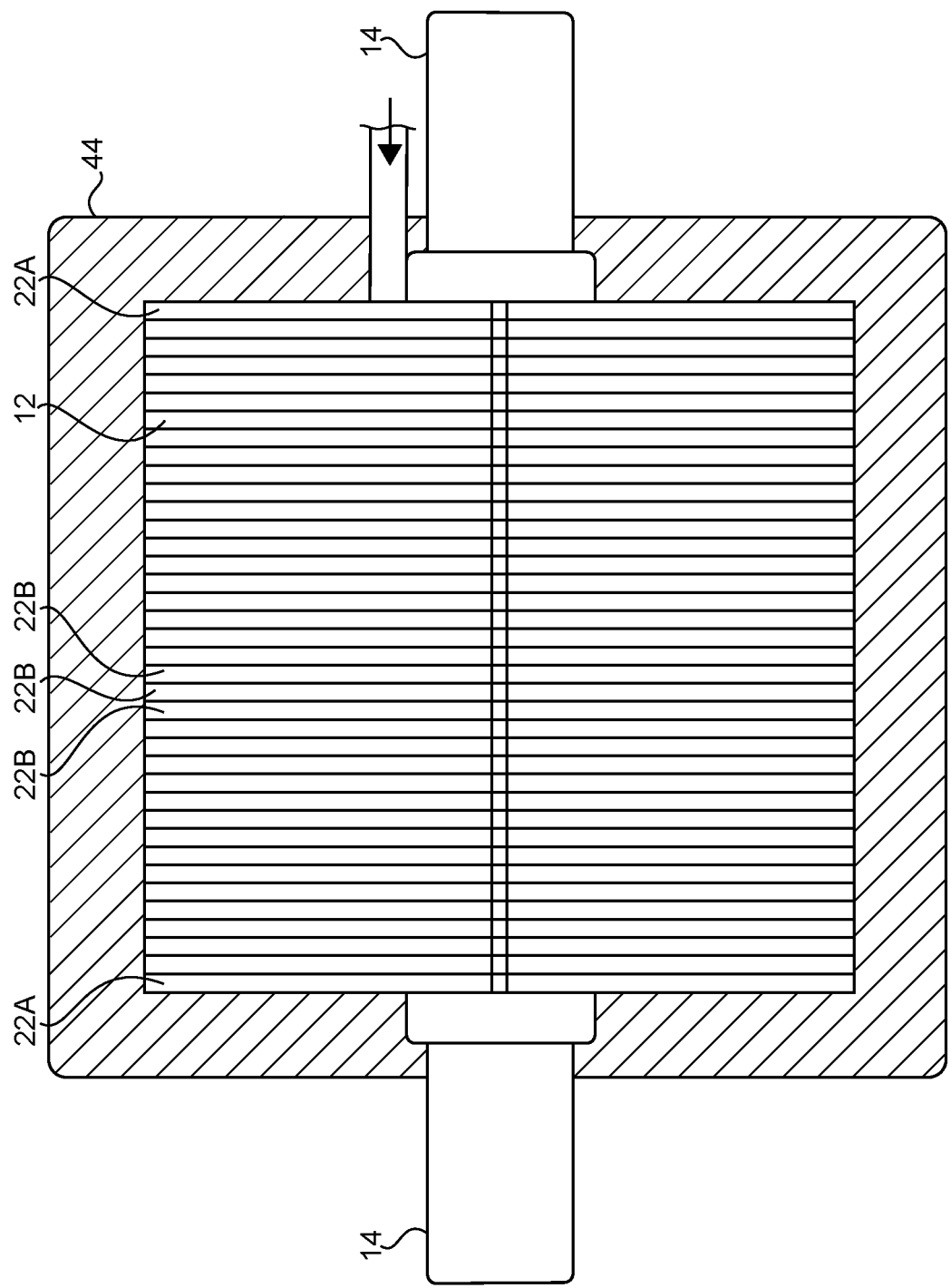
FIG. 6 is a side view showing the rotor in a mold.

If the rotor core 12 is made of stacked laminations 22, it may also be possible to vary the features in the laminations 22 throughout the stack. That is, where the laminations 22 are stacked along the length of the shaft 14, with each lamination 22 having a lamination central opening 26 corresponding to the rotor central opening 26, the features of the central opening 26 may vary along the length of the rotor core 12. For example, as shown in FIG. 5, one desirable variation may be to provide some of the laminations 22B with a lamination central opening 26 without any protrusions 30 so that the circumferential gap 32 extends completely around the shaft 14 without any contact between the lamination 22B and the shaft 14. The lamination 22B of FIG. 5 could be combined with other laminations 22A in the stack like FIG. 2, 3 or 4 (e.g., 22A in FIG. 4). As noted above, it is preferable for adjacent laminations 22 in the stack to be adhered to each other, for example by dimpling 24. Thus, it would not be necessary for all of the laminations 22 in the stack to include protrusions 30 for locating the shaft 14 or a key 38 for transferring torque. One advantage of including laminations 22B like FIG. 5 in the stator core 12 is that there is no metallic contact between the stator core lamination 22B and the shaft 14. Thus, magnetic flux leakage from the core 12 to the shaft 14 can be minimized. Mechanical stress on the inner diameter of the rotor may also be minimized, which is desirable for electromagnetic performance, since stress reduces magnetic flux permeability. Additionally, the groove 40 in the shaft 14 need not extend the full length of the core 12 if desired. Where laminations 22B are provided without protrusions 30 and a key 38, it may be desirable for the laminations 22B without protrusions 30 and key 38 to be the majority of the laminations 22, and laminations 22A with protrusions 30 and keys 38 to be the minority as shown in FIG. 6. This would minimize magnetic flux leakage. It may also be desirable to have a greater concentration of laminations 22B without protrusions 30 and keys 38 near the center of the core 12 and a greater concentration of laminations 22A with protrusions 30 or keys 38 near the ends of the core 12.

Turning to FIG. 6, the resin 28 may be applied to the circumferential gap 32 by placing the rotor assembly in a mold 44 and injecting the resin 28 into the mold 44. As a result, the resin 28 fills the circumferential gap 32 as described above. If desired, the mold 44 may surround the entire rotor core 12 and inject resin 28 into the entire rotor core 12 so that the resin 28 completely fills any open spaces in the rotor core 12. Thus, the resin 28 may be used to secure other components in the rotor 10 at the same time that resin 28 is injected into the circumferential gap 32. For example, where permanent magnets 20 are positioned in the longitudinal openings 16, resin 28 may fill the circumferential gap 32 around the shaft 14 at the same time that resin 28 fills the longitudinal openings 16 around the permanent magnets 20. Thus, the conventional separate manufacturing step of pressing the shaft 14 into the rotor core 12 can be eliminated, and the connection of the core 12 and shaft 14 can be combined into a single step with securing the permanent magnets 20. Preferably, the resin 28 is a thermoset resin, such as epoxy. One advantage of thermoset resins over thermoplastics is that such resins can be applied with lower temperatures than thermoplastics. Since the magnetism of permanent magnets 20 can be altered by high temperatures, the use of thermoset resins may allow the permanent magnets 20 to be magnetized prior to the resin molding process without affecting the magnetism of the magnets 20 during the resin molding process. Curing of the resin material can be fully performed after application in the manufacturing facility, or can be partially cured, with final curing occurring during initial operation of the motor.

While preferred embodiments of the inventions have been described, it should be understood that the inventions are not so limited, and modifications may be made without departing from the inventions herein. While each embodiment described herein may refer only to certain features and may not specifically refer to every feature described with respect to other embodiments, it should be recognized that the features described herein are interchangeable unless described otherwise, even where no reference is made to a specific feature. It should also be understood that the advantages described above are not necessarily the only advantages of the inventions, and it is not necessarily expected that all of the described advantages will be achieved with every embodiment of the inventions. The scope of the inventions is defined by the appended claims, and all devices and methods that come within the meaning of the claims, either literally or by equivalence, are intended to be embraced therein.

The invention claimed is:

1. A rotor for an electric motor, comprising:
a rotor core having a central opening;
a shaft disposed within the central opening;
at least three protrusions extending into the central opening from the rotor core, the at least three protrusions being fixed to the rotor core, and the at least three protrusions contacting or being within 0.001" of the shaft without being rotationally fixed thereto;
a portion of the central opening forming a circumferential gap disposed between the rotor core and the shaft and between each of the at least three protrusions; and
a resin disposed within the circumferential gap;
wherein the circumferential gap comprises a first width and a second width between the rotor core and the shaft, the second width being at least twice the first width, and the first width extending circumferentially around the shaft at least three times a circumferential length of the second width.

2. The rotor according to claim 1, wherein a portion of the second width is disposed on each side of each of the at least three protrusions, and the first width extends between respective adjacent portions of the portions of the second width.

3. The rotor according to claim 1, wherein a portion of the first width is disposed on each side of each of the at least three protrusions, and the second width is centrally located between two respective adjacent protrusions of the at least three protrusions.

4. The rotor according to claim 1, wherein the rotor core comprises a first non-round portion and the shaft comprises a second non-round portion, the first and second non-round portions being interlocked with each other to rotationally fix the rotor core and shaft together, a lateral gap being disposed between the first and second non-round portions or between a separate key and the first and second non-round portions, the resin being disposed within the lateral gap.

5. The rotor according to claim 1, wherein the rotor core comprises a plurality of laminations, the plurality of laminations being stacked along the length of the shaft, and each lamination comprising a lamination central opening corresponding to the central opening of the rotor core.

6. The rotor according to claim 5, wherein the lamination central openings of a first group of the plurality of laminations comprise the at least three protrusions, and the lamination central openings of a second group of the plurality of laminations comprise a lamination circumferential gap that extends completely around the shaft without the at least three protrusions.

7. The rotor according to claim 6, wherein the first group of the plurality of laminations comprises less than half of the plurality of laminations and the second group of the plurality of laminations comprises more than half of the plurality of laminations.

8. The rotor according to claim 1, wherein the resin is a thermoset resin.

9. The rotor according to claim 1, wherein the at least three protrusions contact the shaft around less than 20% of a circumference of the shaft.

10. The rotor according to claim 1, wherein the rotor core comprises a first non-round portion and the shaft comprises a second non-round portion, the first and second non-round portions being interlocked with each other to rotationally fix the rotor core and shaft together, a lateral gap being disposed between the first and second non-round portions or between a separate key and the first and second non-round portions, the resin being disposed within the lateral gap, and the rotor core comprises a plurality of laminations, the plurality of laminations being stacked along the length of the shaft, and each lamination comprising a lamination central opening corresponding to the central opening of the rotor core.

11. The rotor according to claim 10, wherein the at least three protrusions contact the shaft around less than 20% of a circumference of the shaft, and the resin is a thermoset resin.

12. The rotor according to claim 11, wherein the lamination central openings of a first group of the plurality of laminations comprise the at least three protrusions, the lamination central openings of a second group of the plurality of laminations comprise a lamination circumferential gap that extends completely around the shaft without the at least three protrusions, and the first group of the plurality of laminations comprises less than half of the plurality of laminations and the second group of the plurality of laminations comprises more than half of the plurality of laminations.

13. The rotor according to claim 1, wherein the rotor core comprises second openings located away from the central opening, a permanent magnet being disposed within each of the second openings, and the resin fills a space in each second opening between the rotor core and the permanent magnet, the rotor core comprises a plurality of laminations, the plurality of laminations being stacked along the length of the shaft, and each lamination comprising a lamination central opening corresponding to the central opening of the rotor core, and the resin is a thermoset resin.

14. A method of manufacturing a rotor for an electric motor, comprising:
placing a rotor assembly in a mold, the rotor assembly comprising:
a rotor core having a central opening;
a shaft disposed within the central opening;
at least three protrusions extending into the central opening from the rotor core, the at least three protrusions being fixed to the rotor core, and the at least three protrusions contacting the shaft without being rotationally fixed thereto; and a portion of the central opening forming a circumferential gap disposed between the rotor core and the shaft and between each of the at least three protrusions;

wherein the circumferential gap comprises a first width and a second width between the rotor core and the shaft, the second width being at least twice the first width, and the first width extending circumferentially around the shaft at least three times a circumferential length of the second width; and injecting resin into the mold, wherein the resin fills the circumferential gap.

15. The method according to claim 14, wherein the mold fully encompasses the rotor core, wherein the resin completely fills any open spaces in the rotor core.

16. The method according to claim 15, wherein the rotor core comprises a second opening located away from the central opening, and the rotor assembly comprises an additional component disposed in the second opening and only partially filling the second opening, wherein the resin fills a space in the second opening between the rotor core and the additional component.

17. The method according to claim 16, wherein the additional component is a permanent magnet.

18. The method according to claim 17, wherein the resin is a thermoset resin.

19. The rotor according to claim 12, wherein a portion of the second width is disposed on each side of each of the at least three protrusions, and the first width extends between respective adjacent portions of the portions of the second width.

20. The rotor according to claim 12, wherein a portion of the first width is disposed on each side of each of the at least three protrusions, and the second width is centrally located between two respective adjacent protrusions of the at least three protrusions.

* * * * *